United States Patent [19]

Colvell et al.

[11] Patent Number: 4,694,569
[45] Date of Patent: Sep. 22, 1987

[54] BEARING EXTRACTOR

[76] Inventors: William F. Colvell, 4375 Weber River Dr.; Dean M. Baker, 548 W. 4900 S., both of Ogden, Utah 84405

[21] Appl. No.: 847,354

[22] Filed: Apr. 2, 1986

[51] Int. Cl.⁴ .............................................. B23P 19/04
[52] U.S. Cl. ...................................... 29/724; 29/257; 29/260; 29/264
[58] Field of Search .................. 29/149.5 R, 149.5 C, 29/426.1, 426.5, 244, 256, 257, 258, 259, 260, 261, 262, 263, 264, 265, 266, 724,

[56] References Cited

U.S. PATENT DOCUMENTS

| | | | |
|---|---|---|---|
| 1,570,338 | 1/1926 | Davis | 29/262 |
| 1,650,964 | 11/1927 | Schmitt | 29/262 |
| 1,720,428 | 7/1929 | Naggy et al. | 29/266 |
| 1,778,802 | 10/1930 | Howell | 29/262 |
| 1,804,843 | 5/1931 | Santiago | 29/262 |
| 2,113,755 | 4/1938 | Billington | 29/256 |
| 2,755,540 | 7/1956 | Crozier | 29/265 |
| 3,340,593 | 9/1967 | Savastano | 29/262 |
| 3,579,796 | 5/1971 | Fillion | 29/263 |
| 3,961,410 | 6/1976 | Reed | 29/256 |
| 3,990,139 | 11/1976 | Touchet | 29/261 |
| 4,507,838 | 4/1985 | Hacker | 29/266 X |

FOREIGN PATENT DOCUMENTS

| | | | |
|---|---|---|---|
| 23569 | 11/1929 | Australia | 29/262 |
| 31076 | 11/1926 | France | 29/265 |

Primary Examiner—Howard N. Goldberg
Assistant Examiner—Ronald S. Wallace
Attorney, Agent, or Firm—Jacob N. Erlich; Donald J. Singer

[57] ABSTRACT

A bearing extractor having a support element in which a rod is positioned such that the rod is capable of expanding, within a bearing, the prongs of a bearing grasping assembly. Once the prongs of the bearing grasping assembly grasp the bearing, the bearing is raised by the rod until the case surrounding the bearing engages the support element. Thereafter continued raising of the rod removes the bearing from its case.

2 Claims, 4 Drawing Figures

BEARING EXTRACTOR

STATEMENT OF GOVERNMENT INTEREST

The invention described herein may be manufactured and used by or for the Government for governmental purposes without the payment of any royalty thereon.

BACKGROUND OF THE INVENTION

This invention relates generally to extracting devices and, more particularly to a bearing extractor capable of removing damaged bearings from caps so the caps can be salvaged and replaced with new bearings. Bearings, and more specifically ball bearings, form an essential part of virtually all mechanized equipment. Consequently, it is essential to find a convenient manner in which to remove these bearings after they have become worn. In general these ball bearings are characterized by balls or cylinders confined between outer and inner rings. The balls or rollers are usually spaced uniformally apart by a cage or separator. The rolling elements (balls) are the most important of the bearing since they transmit the loads from the moving parts of the machine to the stationary supports. In general, this ball bearing fits within a cap, casing or housing which is expensive to produce. Consequently, it is extremely desireable to keep the cap intact even during bearing replacement.

In the past, removing such bearings from their cases or caps resulted in damage to the case since standard tools which were used to remove the bearing involved punching, or chiseling, etc. the bearing from its surrounding casing.

It is therefore extremely desirable to provide a tool capable of removing a damaged or worn bearing without damaging the surrounding housing or case so that it may be used in the future to house replacement bearings.

SUMMARY OF THE INVENTION

The present invention overcomes the problems encountered in the past and as set forth in detail hereinabove by providing a bearing extractor which is capable of removing a damaged or worn bearing without adversely affecting the condition of the housing, case or cap in which the bearing is contained. In addition, the bearing extractor is capable of being used in the removal of sleeves, bushings, seats and assorted other types of similar components.

The bearing extractor of the present invention is made up of a rigid inverted U-shaped element having a centrally located opening though which a rod is slidably mounted. The rod has one end thereof in a T-shaped in configuration with the T portion being considered the handle. In addition, threads are formed on the rod intermediate the ends thereof.

At the other end of the rod opposite the T-shaped handle is threadedly mounted an extractor assembly made up of a pair of prongs through which the rod is movable. In its initial operative position the prongs are closely spaced together but have sufficient flexibility to expand upon the insertion, in a cam like fashion, of the rod therebetween.

The remaining component of the present invention is a positioning nut which threadably engages the threads of the rod. The nut is positioned on the rod external of the inverted U-shaped element to support the rod with respect to the inverted U-shaped element.

In use, the prongs of the bearing extractor of the present invention in their retracted position are placed within the central opening of a bearing contained within its appropriate housing or cap. Once in position within the opening of the bearing, the rod is rotated with respect to the prongs while the extractor assembly and positioning nut are held stationary with respect to the rod. As the rod is rotated it passes through the nut and inverted U-shaped element and acts in a cam like fashion to extend the prongs against the interior surface of the bearing.

Once the prongs are positioned against the interior surface of the bearing it is possible to withdraw the rod and extractor assembly by means of the T-shaped handle so that the surrounding housing or case of the bearing rests against the bottom surface of the inverted U-shaped element. In this position, the nut is tightened against the inverted U-shaped element so as to force the rod in an upward direction in order to withdraw the bearing from the housing or case which firmly rests against the bottom of the inverted U-shaped element. Continued rotation of the nut produces complete removal of the bearing without any damage to the surrounding case or housing.

It is therefore an object of this invention to provide an extractor capable of easily removing a bearing from its surrounding case or housing without damaging the surrounding case or housing.

It is another object of this invention to provide a bearing extractor capable of removing the interior bearing from a case or housing without physically grasping or gripping this housing.

It is a further object of this invention to provide a bearing extractor which can quickly remove the bearing from its surrounding case or housing.

It is an even further object of this invention to provide a bearing extractor which utilizes conventional, currently available components for the manufacture thereof.

For a better understanding of the present invention, together with other and further objects thereof, reference is made to the following description taken in conjunction with the accompanying drawings and its scope will be pointed out in the appended claims.

DETAILED DESCRIPTION OF THE PREFERRED EMBODIMENT

Figure 1:
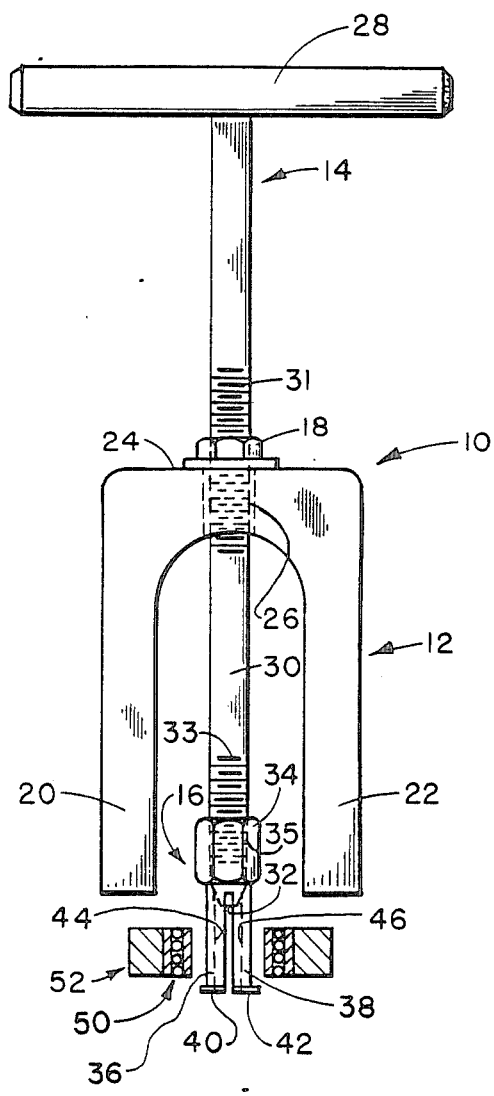
FIG. 1 is a side elevational view, shown partly in cross section, of the bearing extractor of this invention in its initial position of operation.

Reference is now made to FIG. 1 of the drawings which clearly illustrates the bearing extractor 10 of the present invention. As illustrated therein bearing extractor 10 is made up of four major components: (1) An inverted U-shaped support elexent 12; (2) a rod/handle 14; (3) a bearing grasping extractor assembly 16; and (4) a positioning nut 18.

More specifically, the inverted U-shaped support elexent 12 has a pair of legs 20 and 22 which are rigidly formed as a single piece to define a flat surfaced top portion 24. In addition, the flat top portion 24 has a longitudinally extending opening 26 formed therein. The rod/handle 14 is of a diameter slightly smaller than opening 26 and passes therethrough. At one end of the rod/handle 14 is located the handle 28 forming a T-shaped configuration with respect to rod 30.

Rod 30 is threaded at 31 midway between the ends thereof with the end of rod 30 opposite handle 28 being configured in a somewhat V-shaped end portion 32, with threads 33 also adjacent this end of rod 30. The extractor assembly 16 has internal threads 35 so as to threadably mount on rod 30 such that rod 30 can move in the downward direction with respect thereto in a manner to be explained in greater detail hereinbelow.

More specifically, extractor assembly 16 is made up of a nut-shaped support 34 terminating in a pair of prongs 36 and 38 which themselves terminate in ledges 40 and 42. It is important to realize that internal threads 35 not only are situated within nut-shaped support 34, but also are situated part way into prongs 36 and 38. Such an arrangement adds substantial strength to the prongs, which is required in the subsequent bearing removal process. The interior 44 and 46 of prongs 36 and 38, respectively, also have a portion thereof which decreases in internal diameter in direct relationship to its distance from the end of rod 30. In this manner the interior diameter of the prongs 36 and 38 act as a follower in the cam-like action of end 32 of rod 30 as it pushes thereagainst so as to expand the extractor assembly 16 by forcing prongs 36 and 38 in the outward direction. The exact movement of extractor assembly 16 and rod 30 will be shown in greater detail in the remaining figures of the drawings. Supporting rod 30 within opening 26 of support element 12 is a positioning nut 18. Nut 18 threadably mounts upon rod 30 and bears against the top surface 24 of support element 12.

In order to use the bearing extractor 10 of the present invention any suitable bearing 50 positioned within a conventional supporting casing or cap 52 is positioned about grasping prongs 36 and 38 of extractor assembly 16. This initial operating condition is illustrated in FIG. 1 of the drawings.

Figure 2:
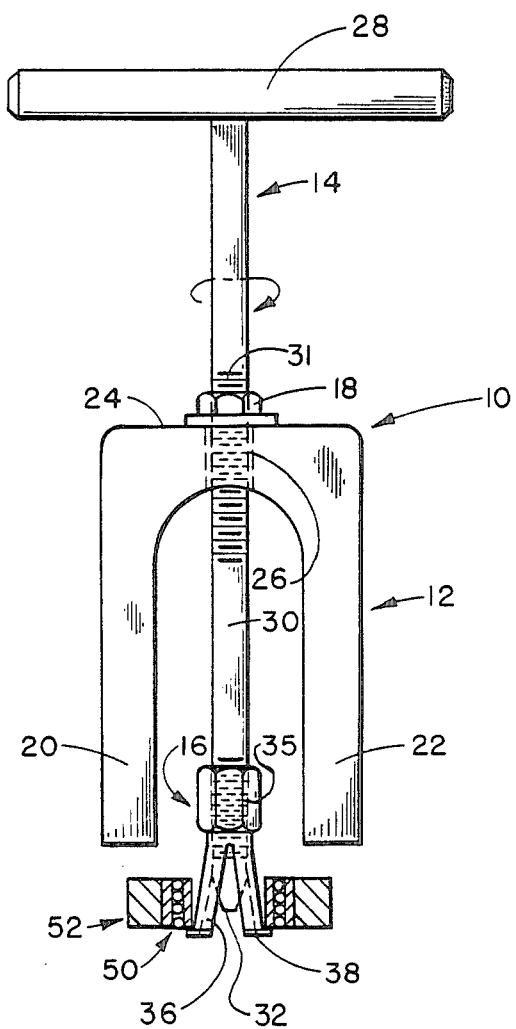
FIG. 2 is a side elevational view, shown partly in cross section, of the bearing extractor of the present invention in which the prongs are in its extended position grasping the interior surface of a bearing to be removed from its housing.

Once the bearing 50 is positioned around the prongs 36 and 38 as illustrated in FIG. 1 of the drawings, positioning nut 18 is prevented from rotating by a conventional wrench or the like and handle 28 is rotated in the clockwise direction with respect to positioning nut 18 while support nut 34 is also fixedly held in position by any conventional wrench, such as a 7/16 wrench, so as to prevent the extractor assembly 16 from moving with respect to rod 30. As illustrated in FIG. 2 of the drawings as rod 30 is rotated in the clockwise direction with respect to positioning nut 18 and extractor assembly 16 it moves in the downward direction with respect to extractor assembly 16. As a result of the cam-like action of the end 32 of rod 30 with respect to the internal configuration of prongs 36 and 38, prongs 36 and 38 expand so as to engage the interior of the bearing 50. The ledges 40 and 42 in this position engage beneath the bearing 50 as also clearly illustrated in FIG. 2 of the drawings.

Figure 3:
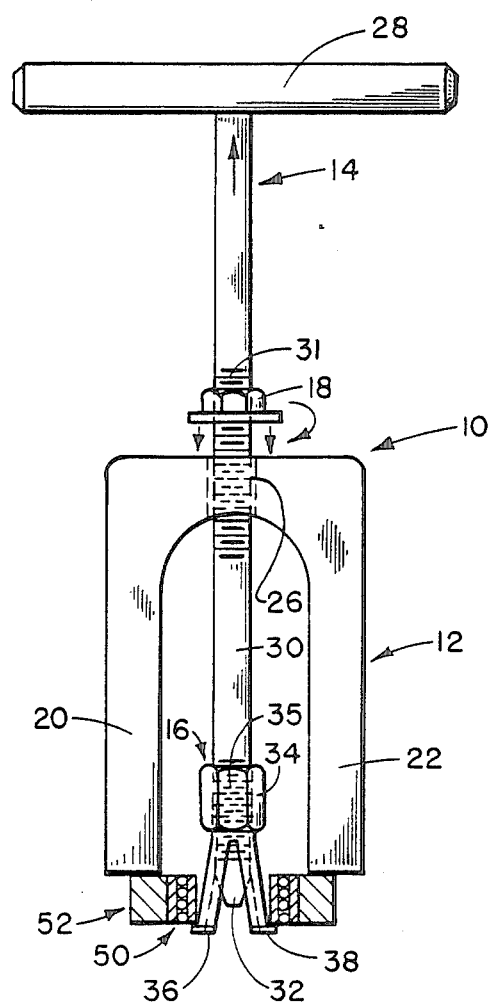
FIG. 3 is a side elevational view, shown partly in cross section, of the bearing extractor of the present invention in which the bearing extractor is in position to commence removal of the bearing.

Once the prongs 36 and 38 are in its position against the interior of bearing 50 as illustrated in FIG. 2 of the drawings, rod 30 by means of handle 28 is raised to the position shown in FIG. 3 of the drawings. In this position the entire bearing assembly including bearing 50 and cap 52 is raised such that the cap or housing 52 engages the bottom of legs 20 and 22 of support 12. Once the bearing cap or housing 52 can be raised no further, then the positioning nut 18 is rotated in the clockwise direction bringing it against the upper surface 24 of support 12 as illustrated by the arrows shown in FIG. 3 of the drawings.

Figure 4:
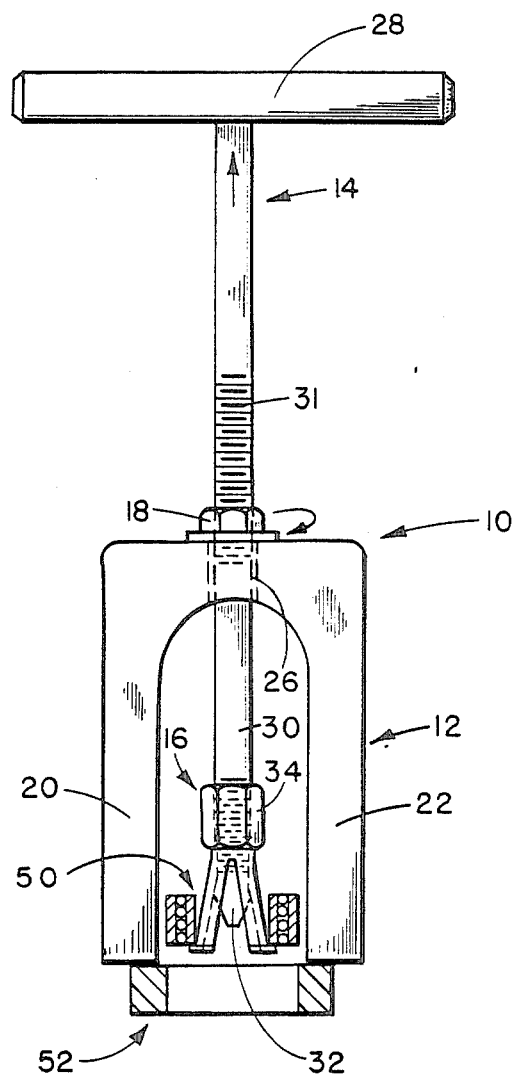
FIG. 4 is a side elevational view, shown partly in cross section, of the bearing extractor of the present invention shown with the bearing being removed from its surrounding housing or casing.

Continued rotation of the positioning nut 18 in the clockwise direction forces the rod 30 in the upward direction as illustrated in FIG. 4 of the drawings and consequently draws the bearing 50 out from the housing or case 52 which surrounds it. As shown in FIG. 4 of the drawings there is no gripping action necessary on the bearing cap or casing 52, and consequently no damage is effected thereon. The continued rotation of positioning nut 18 will completely remove the bearing 50 from its housing or case 52 as clearly illustrated in FIG. 4 of the drawings.

By the extraction procedure described above with the use of the bearing extractor 10 of the present invention no damage occurs to the cap, housing or case 52 and the damaged or worn bearing 50 can thereafter be replaced within the case or housing 52 by another bearing 50 in an appropriate manner for further use.

Although this invention has been described with reference to a particular embodiment, it will be understood that this invention is also capable of further and other embodiments within the spirit and scope of the appended claims.

We claim:

1. A bearing extractor, comprising:
   U-shaped support having a flat top portion and a pair of legs capable of impacting a case surrounding a bearing to be extracted;
   a bearing grasping assembly, said assembly including a nut-shaped support having internal threads and a pair of expandable prongs extending from said nut-shaped support, each of said prongs having internal threads and a ledge formed at the bottom thereof for engaging the bottom of said bearing;
   a rod, said rod being slidable and rotatable within said top portion of said U-shaped support and rotatable within said bearing grasping assembly, said rod having threads for engaging said threads of said nut-shaped support and said prongs, and said prongs having a preselected internal configuration for engaging an end of said rod in order to expand said prongs against the interior surface of said bearing when said rod is rotated into said nut-shaped support, and said rod having a handle at another end thereof; and
   means for encompassing said rod for adjustably supporting said rod with respect to said U-shaped support;
   whereby after said prongs of said bearing grasping assembly are expanded against the interior surface of said bearing, outward movement of said rod draws said bearing case into contact with said legs of said U-shaped support, and further outward movement of said rod removes said bearing from said bearing case.

2. A bearing exterior as defined in claim 1 wherein said rod had threads formed thereon midway between the ends thereof and said encompassing means comprises a nut threadably engaging said threads formed midway on said rod, and said encompassing means is capable of resting on said flat top portion of said U-shaped support.

* * * * *